US010568195B2

(12) United States Patent
Bezel et al.

(10) Patent No.: US 10,568,195 B2
(45) Date of Patent: Feb. 18, 2020

(54) SYSTEM AND METHOD FOR PUMPING LASER SUSTAINED PLASMA WITH A FREQUENCY CONVERTED ILLUMINATION SOURCE

(71) Applicant: KLA-Tencor Corporation, Milpitas, CA (US)

(72) Inventors: Ilya Bezel, Mountain View, CA (US); Anatoly Shchemelinin, Bozeman, MT (US); Matthew Derstine, Los Gatos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/051,559

(22) Filed: Aug. 1, 2018

(65) Prior Publication Data

US 2019/0373709 A1   Dec. 5, 2019

Related U.S. Application Data

(60) Provisional application No. 62/677,827, filed on May 30, 2018.

(51) Int. Cl.
*H05H 1/02* (2006.01)
*H01S 3/00* (2006.01)
(Continued)

(52) U.S. Cl.
CPC ............ *H05H 1/02* (2013.01); *G02F 1/353* (2013.01); *G02F 1/37* (2013.01); *H01S 3/0092* (2013.01);
(Continued)

(58) Field of Classification Search
CPC .. H05H 1/02; G21F 1/353; G21F 1/37; G21F 2001/354; G21F 2001/3542; H01S 3/0092;
(Continued)

(56) References Cited

U.S. PATENT DOCUMENTS 5,428,226 A   6/1995 Adams
5,608,526 A   3/1997 Piwonka-Corle et al.
(Continued)

FOREIGN PATENT DOCUMENTS

EP    3213339 A1    9/2017
JP    2001153823 A   6/2001
(Continued)

OTHER PUBLICATIONS

Schreiber, A. et al., "Radiation resistance of quartz glass for VUV discharge lamps", J. Phys. D: Appl. Phys. 38 (2005), pp. 3242-3250.
(Continued)

*Primary Examiner* — Nicole M Ippolito
*Assistant Examiner* — Hanway Chang
(74) *Attorney, Agent, or Firm* — Suiter Swantz pc llo

(57) ABSTRACT

A system for generating pump illumination for laser sustained plasma (LSP) is disclosed. In embodiments, the system includes an illumination source configured to output illumination having a first spectral frequency and an optical frequency converter. The optical frequency converter can be configured to receive the illumination having the first spectral frequency from the illumination source and configured to output pump illumination having a second spectral frequency that is different from the first spectral frequency.

36 Claims, 9 Drawing Sheets

(51) Int. Cl.
*H01S 3/16* (2006.01)
*H05G 2/00* (2006.01)
*G02F 1/37* (2006.01)
*H01S 3/11* (2006.01)
*G02F 1/35* (2006.01)
*H01S 3/06* (2006.01)
*H01S 3/067* (2006.01)

(52) U.S. Cl.
CPC .............. *H01S 3/11* (2013.01); *H01S 3/162* (2013.01); *H01S 3/1611* (2013.01); *H01S 3/1643* (2013.01); *H05G 2/008* (2013.01); *G02F 2001/354* (2013.01); *G02F 2001/3542* (2013.01); *H01S 3/0604* (2013.01); *H01S 3/06708* (2013.01)

(58) Field of Classification Search
CPC .......... H01S 3/11; H01S 3/1611; H01S 3/162; H01S 3/1643; H01S 3/0604; H01S 3/06708; H05G 2/008
USPC ......... 250/492.1, 492.2, 493.1, 494.1, 503.1, 250/504 R
See application file for complete search history.

(56) References Cited

U.S. PATENT DOCUMENTS

| | | | |
|---|---|---|---|
| 5,999,310 | A | 12/1999 | Shafer et al. |
| 6,297,880 | B1 | 10/2001 | Rosencwaig et al. |
| 7,435,982 | B2 | 10/2008 | Smith |
| 7,525,649 | B1 | 4/2009 | Leong et al. |
| 7,786,455 | B2 | 8/2010 | Smith |
| 7,889,339 | B1 | 2/2011 | Flock et al. |
| 8,618,254 | B2 | 12/2013 | Giaccia et al. |
| 8,698,399 | B2 | 4/2014 | Bezel et al. |
| 9,099,292 | B1 | 8/2015 | Bezel et al. |
| 9,185,788 | B2 | 11/2015 | Bezel et al. |
| 9,318,311 | B2 | 4/2016 | Chimmalgi et al. |
| 9,404,872 | B1 | 8/2016 | Wang et al. |
| 9,506,871 | B1 | 11/2016 | Flock |
| 9,519,093 | B2 | 12/2016 | Rotter et al. |
| 9,558,858 | B2 | 1/2017 | Shortt et al. |
| 9,615,439 | B2 | 4/2017 | Bezel et al. |
| 9,723,703 | B2 | 8/2017 | Bezel et al. |
| 9,735,534 | B2 | 8/2017 | Solarz et al. |
| 9,775,226 | B1 | 9/2017 | Bezel et al. |
| 9,927,094 | B2 | 3/2018 | Bezel et al. |
| 2007/0002465 | A1 | 1/2007 | Chuang et al. |
| 2009/0180176 | A1 | 7/2009 | Armstrong et al. |
| 2011/0150015 | A1 | 6/2011 | Zhou |
| 2013/0114085 | A1 | 5/2013 | Wang et al. |
| 2016/0381776 | A1 | 12/2016 | Derstine et al. |
| 2017/0164457 | A1 | 6/2017 | Bezel et al. |

FOREIGN PATENT DOCUMENTS

| | | |
|---|---|---|
| JP | 2003158314 A | 5/2003 |
| WO | 2016209995 A1 | 12/2016 |
| WO | 2017058790 A1 | 4/2017 |

OTHER PUBLICATIONS

International Search Report dated Sep. 20, 2019 for PCT/US2019/034450.

SYSTEM AND METHOD FOR PUMPING LASER SUSTAINED PLASMA WITH A FREQUENCY CONVERTED ILLUMINATION SOURCE

CROSS-REFERENCE TO RELATED APPLICATIONS

The present application claims the benefit under 35 U.S.C. § 119(e) of U.S. Provisional Application Ser. No. 62/677,827, filed May 30, 2018 and titled "LASER SUSTAINED PLASMA (LSP) PUMPED BY FREQUENCY CONVERTED LASER," with inventors Ilya Bezel, Anatoly Shchemelinin, and Matthew Derstine, which is incorporated herein by reference in its entirety.

TECHNICAL FIELD

The present disclosure relates generally to illumination sources and more particularly to laser sustained plasma (LSP) sources.

BACKGROUND

Laser sustained plasmas (LSPs) can be employed as illumination sources and are typically superior in brightness to electrical discharge lamps, carbon dioxide ($CO_2$), direct diode, or fiber lasers are often used as pump sources for these plasmas.

Very high operating power of the lasers is required to pump LSP. Typically, high-power regime of operation starts at approximately a few hundred Watt of continuous wave (CW) pump power. Some solutions employ CW lasers which operate in the IR spectral range. In the high-power regime, the plasmas start to increase in size with power, growing in the direction of the pump laser. Plasma growth limits the temperature that can be achieved in the plasma center and thus limits the maximum spectral radiance that can be achieved. The size of the plasma is correlated to plasma absorption at the temperatures near the plasma sustainability threshold. Typically, absorption of the plasmas at these temperatures (e.g., about 10,000K) is stronger in the infrared (IR) spectral range than in the visible (VIS) spectral range. Thus, when pumped by IR illumination, LSPs tend to have larger size compared to LSPs pumped by shorter wavelength illumination. Few lasers are available in high-power, multi-kW regime in the VIS spectral range when operating in CW. This limits the application of VIS lasers for pumping LSP.

SUMMARY

A system for generating pump illumination for laser sustained plasma (LSP) is disclosed, in accordance with one or more illustrative embodiments of the present disclosure. In one illustrative embodiment, the system includes an illumination source configured to output illumination having a first spectral frequency and an optical frequency converter. In embodiments, the optical frequency converter is configured to receive the illumination having the first spectral frequency from the illumination source and is configured to output pump illumination having a second spectral frequency that is different from the first spectral frequency.

A system for generating broadband illumination by pumping LSP with a frequency converted illumination source is also disclosed, in accordance with one or more illustrative embodiments of the present disclosure. In one illustrative embodiment, the system includes a plasma forming material, an illumination source configured to output illumination having a first spectral frequency, an optical frequency converter, and one or more optical elements. In embodiments, the optical frequency converter is configured to receive the illumination having the first spectral frequency from the illumination source and is configured to output pump illumination having a second spectral frequency that is different from the first spectral frequency. In embodiments, the one or more optical elements are configured to direct the pump illumination to the plasma forming material, whereby the pump illumination causes the plasma forming material to form a plasma that emits broadband illumination.

A method of generating broadband illumination by pumping LSP with a frequency converted illumination source is also disclosed, in accordance with one or more illustrative implementations of the present disclosure. In one illustrative implementation, the method includes: generating illumination having a first spectral frequency; converting the illumination having the first spectral frequency to pump illumination having a second spectral frequency that is different from the first spectral frequency; and directing the pump illumination to a plasma forming material, whereby the pump illumination causes the plasma forming material to form a plasma that emits broadband illumination.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1A through 6, systems and methods for generating broadband illumination by pumping laser sustained plasma (LSP) with a frequency converted illumination source are also disclosed, in accordance with illustrative embodiments of the present disclosure. In embodiments, pump illumination is generated by frequency up-conversion (e.g., frequency doubling or tripling), as opposed to using fundamental laser output. In embodiments, the pump source can be either a continuous wave (CW) or high-repetition rate pulsed illumination source (e.g., laser). The use of a pulsed laser may be advantageous since the up-conversion (e.g., frequency multiplication (doubling, tripling, etc.) of the laser fundamental harmonic) is much easier when using a pulsed illumination source as opposed to a CW illumination source. In the case of a pulsed illumination source, the repetition rate of the pulses may be faster than the plasma decay time (e.g., on the order of one or more microseconds). For example, the repetition rate of the pulses may be on the order one or more megahertz (MHz).

Figure 2:
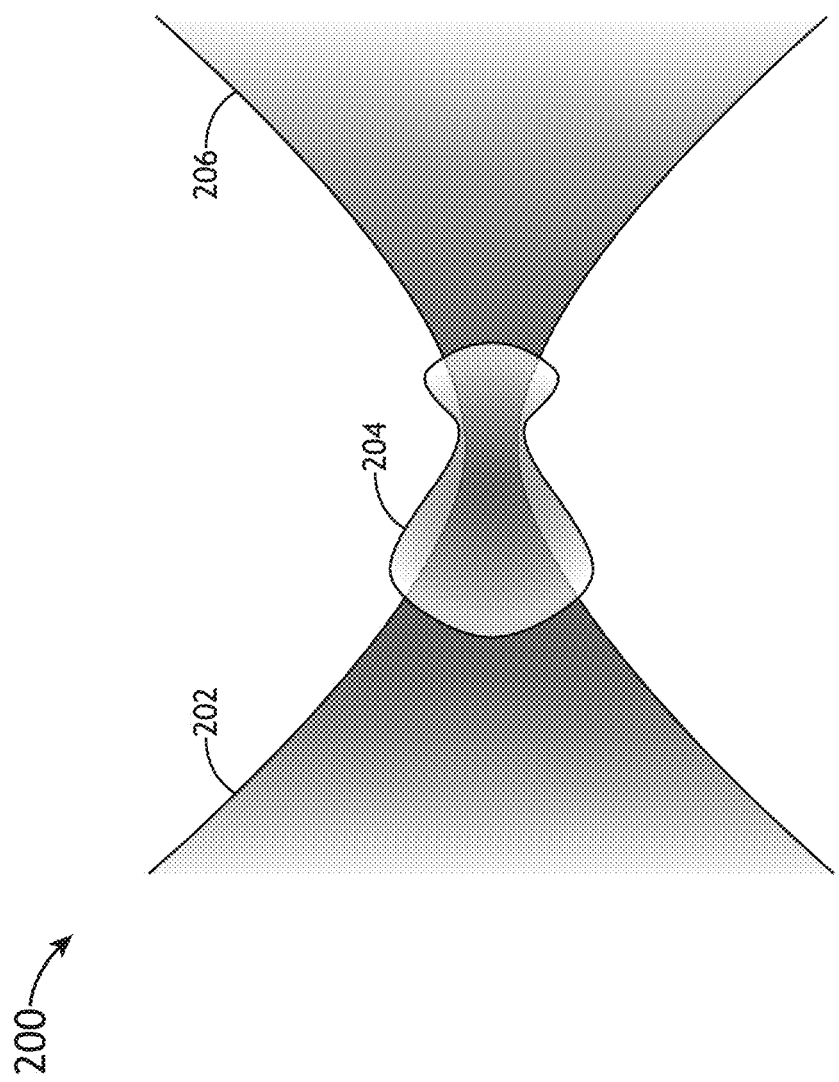
FIG. 2 is a schematic illustration of illumination absorption and emission at a plasma site in a system for generating broadband illumination, such as the system illustrated in FIG. 1A, in accordance with one or more embodiments of the present disclosure.

FIG. 2 illustrates an interaction 200 between pump illumination 202 (e.g., laser illumination) and plasma 204 (e.g., LSP) produced near the focus of a pump source. The plasma 204 is sustained by absorbing the pump illumination 202 and emits broadband illumination 206. In high-power regime, plasma size is dictated by the balance of illumination 202 absorbed by the plasma 204 and illumination 206 emitted by the plasma 204 (and other losses, e.g., due to thermal conductivity) at the plasma edge. Since the pump source (e.g., laser) is focused, the intensity of the pump illumination 202 increases gradually toward the focal point and at some point exceeds the value needed to sustain the plasma 204. The plasma edge forms near this region. As the power of the pump illumination 202 increases, this edge moves farther and farther away from the focus, and the plasma 204 increases in size. Since the plasma 204 continues to absorb the pump illumination 202 on the way to the focus, it is beneficial to have smaller plasma that does not absorb as much power from the pump illumination and has better transmission to the focus. Smaller plasma results in higher illumination intensity at the focus and, ultimately, higher temperature.

Figure 3A:
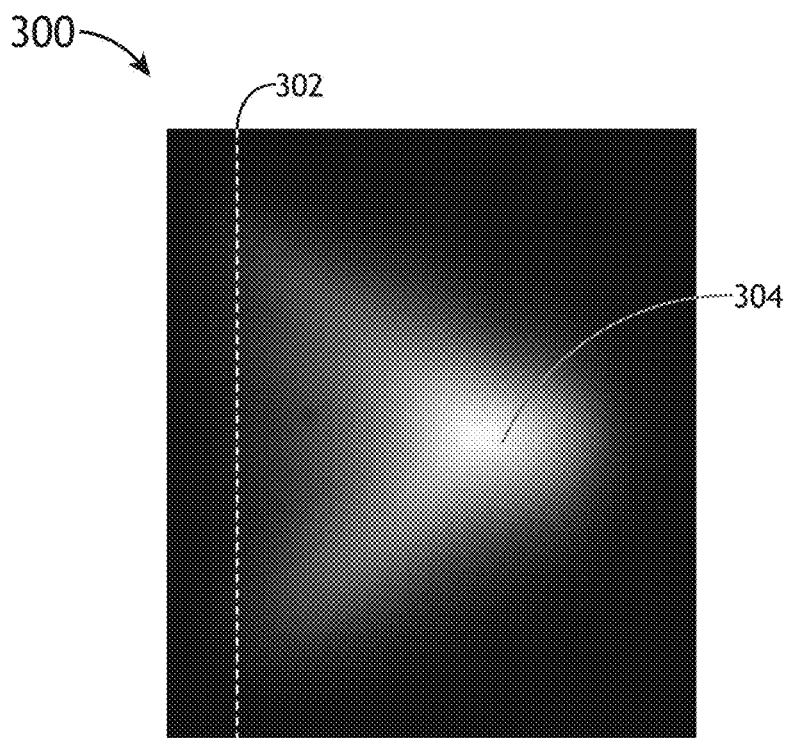
FIG. 3A is an example view of LSP pumped with illumination on the absorption line for the LSP, in accordance with one or more embodiments of the present disclosure.
Figure 3B:
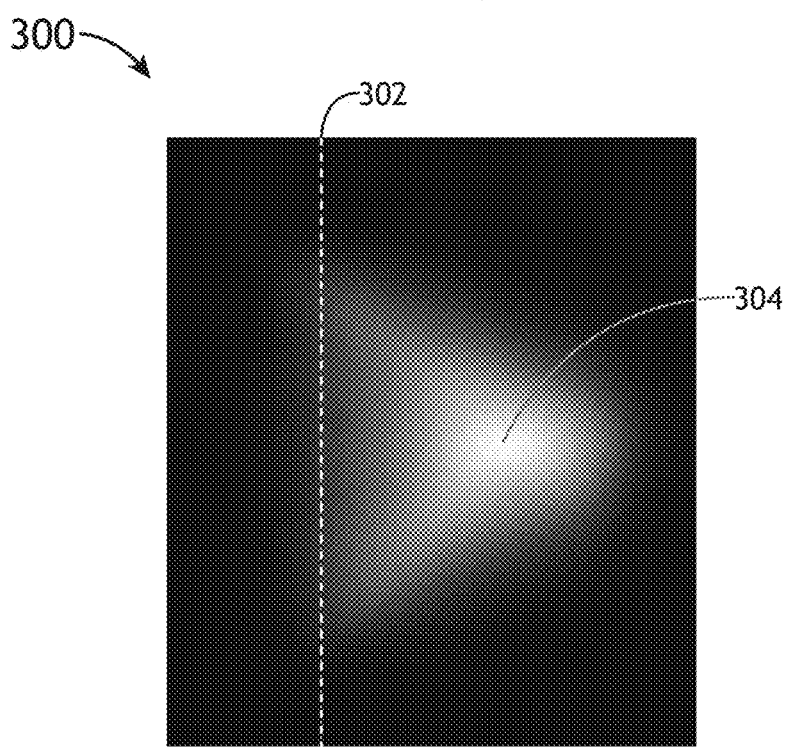
FIG. 3B is an example view of LSP pumped with illumination off the absorption line for the LSP, in accordance with one or more embodiments of the present disclosure.

Example images 300 illustrating difference of plasma absorption on plasma size are presented in FIGS. 3A and 3B, where the plasma 304 was pumped on an absorption line 302 (FIG. 3A) and away from an absorption line 302 (FIG. 3B) of xenon (Xe). In FIGS. 3A and 3B, it can be seen that as little as 2 nm difference in center wavelength on an approximately 10 nm wide laser line results in significant difference in plasma size. For example, FIG. 3A (on absorption line) shows a larger, colder plasma 304, while FIG. 3B (~2 nm off absorption line) shows a smaller, brighter plasma 304.

Figure 4:
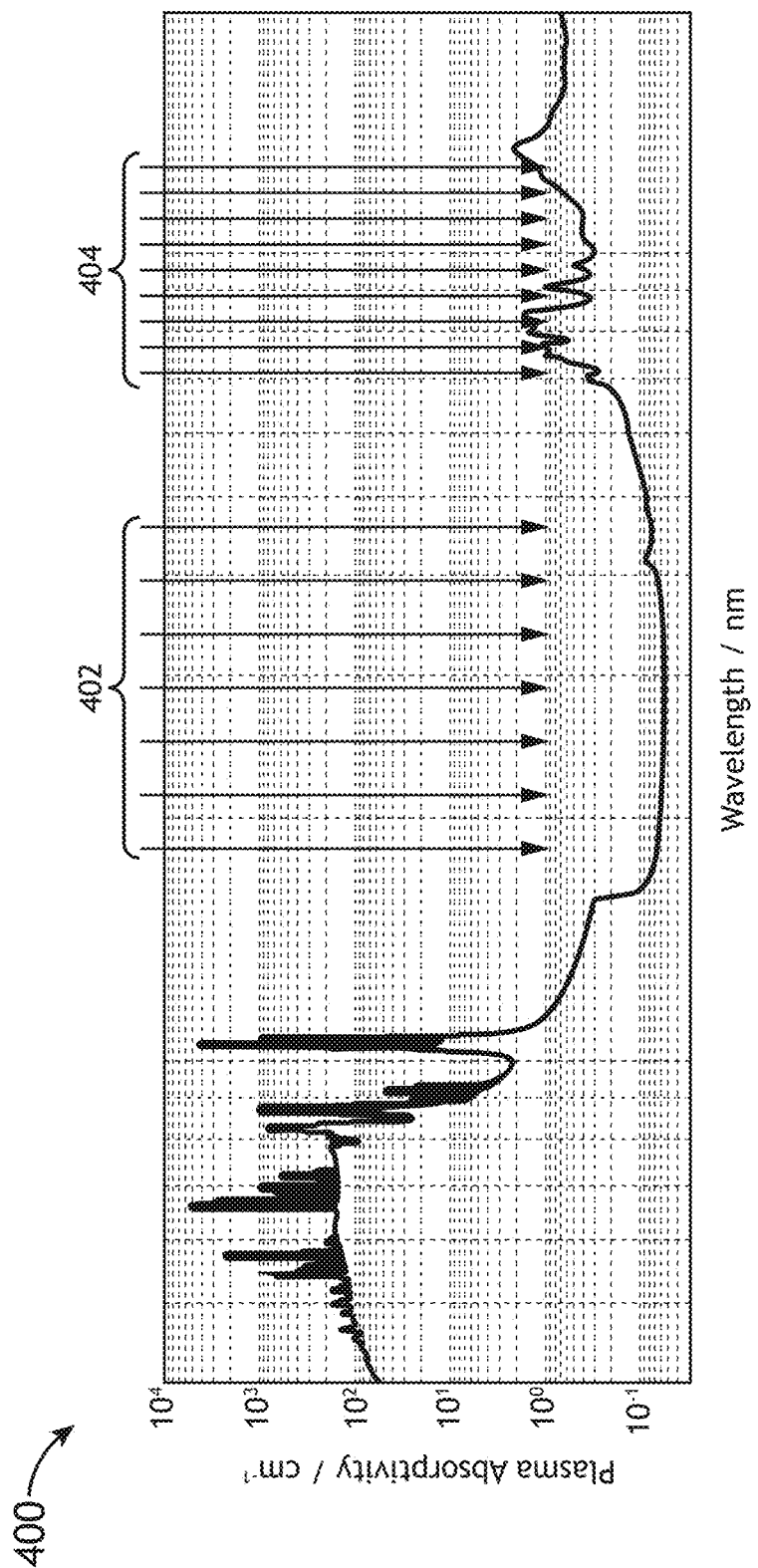
FIG. 4 is a graphical plot of plasma absorptivity for infrared and near-infrared ranges of illumination, in accordance with one or more embodiments of the present disclosure.

Most elements once heated to approximately 10,000 K of the plasma boundary temperature have relatively high absorption coefficients in the near-IR (and especially in the deep IR) spectral ranges and in VUV. These spectral ranges are not the best for pumping high-power LSP. For example, FIG. 4 shows a graphical plot 400 of illumination wavelength (in IR spectral range) versus plasma absorptivity for a 10 atm, 15,000 K, argon (Ar) absorption spectrum. As can be seen in FIG. 4, the plasma absorptivity of IR pump illumination at fundamental wavelengths 404 is higher than the plasma absorptivity of frequency up-converted IR pump illumination (wavelengths 402). The frequency up-converted pump illumination has lower absorption by the plasma near the plasma edge resulting in smaller (and brighter) plasma. Most of commercially available lasers in multi-kW power range are in the region of near-IR. Thus, it is beneficial to pump plasma by second, third, or fourth harmonics of the fundamental laser output with shorter wavelength and reduced plasma absorptivity.

Figure 5:
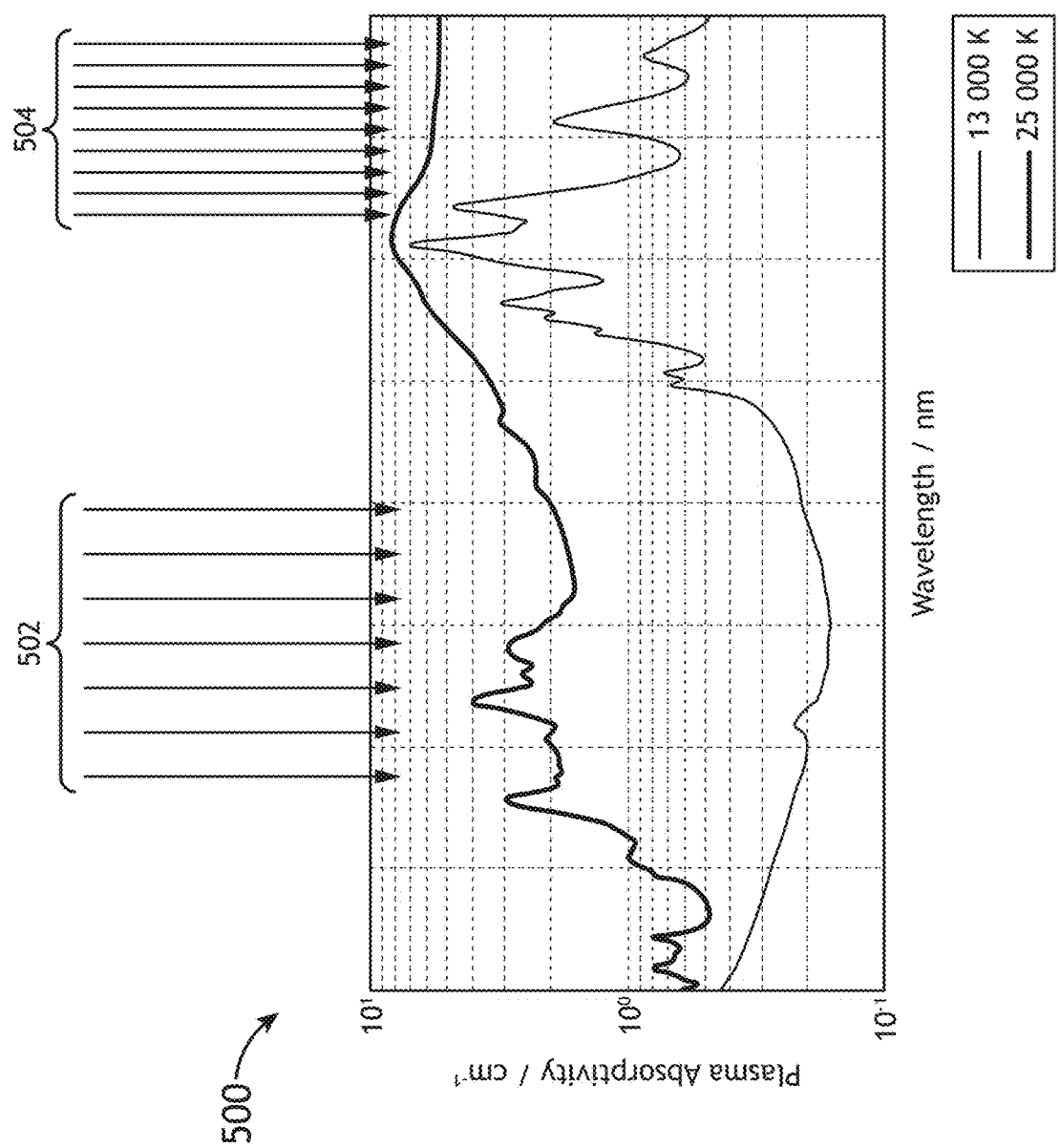
FIG. 5 is a graphical plot of plasma absorptivity for visible and near-visible ranges of illumination, in accordance with one or more embodiments of the present disclosure.

In order to provide the highest temperature of the plasma, not only does the pump illumination have to go through the plasma periphery, it should also be absorbed near the plasma center. Most materials tend to have their absorption increased in the visible (VIS) wavelength range by more than in the IR when going from the lower temperature at the plasma edge to higher temperature near the plasma center. For example, a graphical plot 500 in FIG. 5 shows how plasma absorption increases between 13,000 K and 25,000 K in 30 atm Ar. As can be seen in FIG. 5, the plasma absorptivity of VIS pump illumination at fundamental wavelengths 504 is higher than the plasma absorptivity of frequency up-converted VIS pump illumination (wavelengths 502). Absorption increases by more in the VIS spectral range than it does in the IR spectral range making the VIS range more beneficial for pumping the plasma center.

The foregoing examples and ranges are not intended as limitations on the present disclosure unless otherwise provided herein. In general, the examples illustrate the advantages of up-converting fundamental output of a pump illumination source in order to provide shorter wavelength illumination with reduced absorptivity at the plasma edge to generate and/or sustain a smaller, brighter plasma (e.g., LSP). In accordance with these principles, systems and methods for generating illumination to pump LSP are disclosed.

Figure 1A:
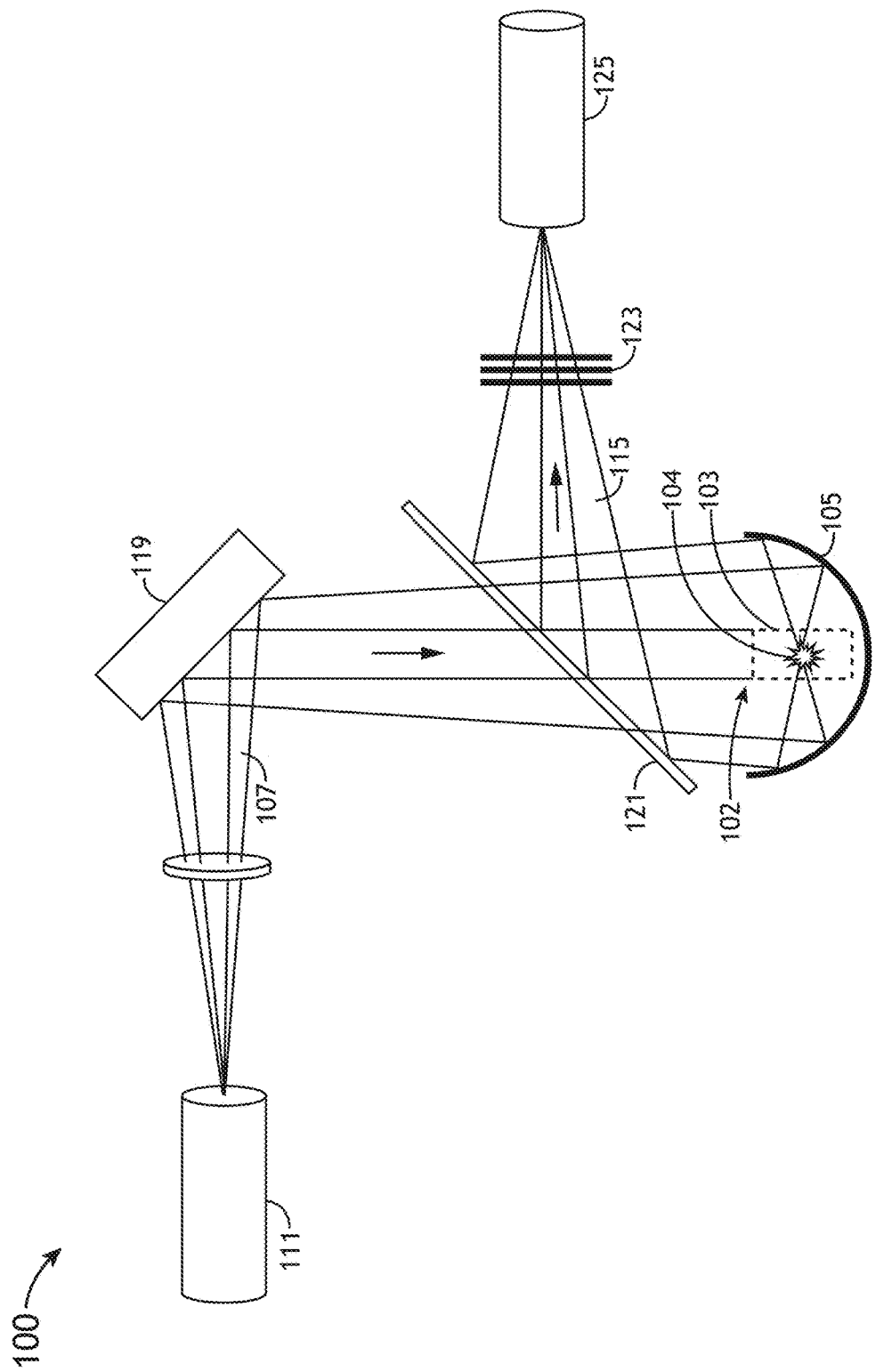
FIG. 1A is a schematic illustration of a system for generating broadband illumination, in accordance with one or more embodiments of the present disclosure.
Figure 1B:
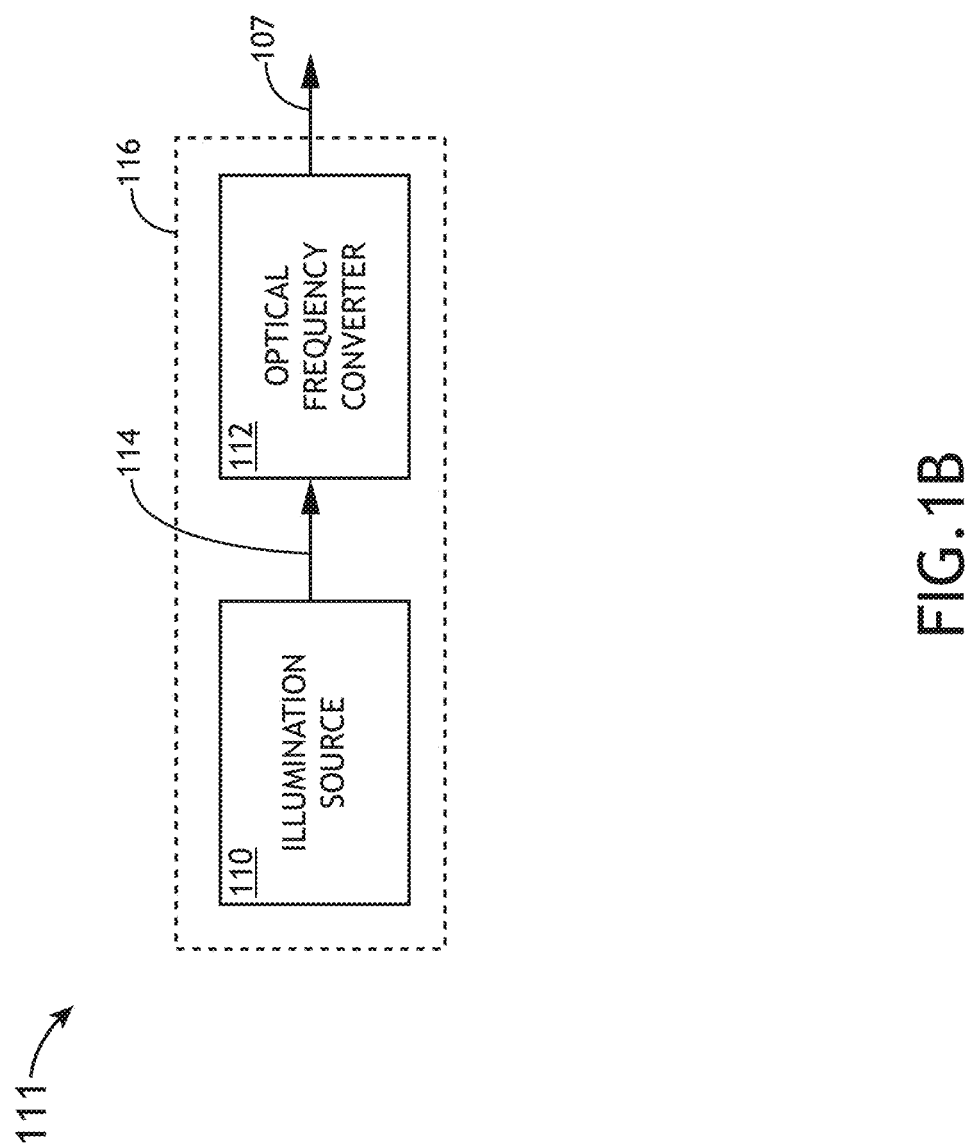
FIG. 1B is a schematic illustration of a frequency converted illumination source that can be employed in a system for generating broadband illumination, such as the system illustrated in FIG. 1A, in accordance with one or more embodiments of the present disclosure.

FIGS. 1A and 1B illustrate a LSP illumination system 100 for generating broadband illumination by forming and/or sustaining LSP, in accordance with one or more embodiments of the present disclosure. The generation of plasma is generally described in U.S. Pat. No. 7,786,455, granted on Aug. 31, 2010; and U.S. Pat. No. 7,435,982, granted on Oct. 14, 2008, which are incorporated herein by reference in their entirety. Various plasma cell designs and plasma control mechanisms are described in U.S. Pat. No. 9,318,311, granted on Apr. 19, 2016, which is incorporated herein by reference in the entirety. The generation of plasma is also generally described in U.S. Pat. No. 9,615,439, granted on Apr. 4, 2017, which is incorporated by reference herein in the entirety. Plasma cell and control mechanisms are also described in U.S. Pat. No. 9,775,226, granted on Sep. 26, 2017, which is incorporated by reference herein in the entirety. Plasma cell and control mechanisms are also described in U.S. Pat. No. 9,185,788, granted on Nov. 10, 2015, which is incorporated by reference herein in the entirety. Plasma cell and control mechanisms are also described in U.S. Pat. No. 9,927,094, granted on Mar. 27, 2018, which is incorporated by reference herein in the entirety. In a general sense, the system 100 should be interpreted to extend to any plasma (e.g., LSP) based illumination source known in the art.

In embodiments, the system 100 includes an illumination system 111 configured to generate pump illumination 107 of a selected wavelength, or wavelength range, such as, but not limited to, IR illumination or VIS illumination. As shown in FIG. 1B, the illumination system 111 includes an illumination source 110 (e.g., one or more lasers) and an optical frequency converter 112. In an embodiment, the illumination source 110 and the optical frequency converter 112 are distinct. For example, the optical frequency converter 112 can be optically coupled to but physically separate from the illumination source 110 (e.g., having its own separate housing). In another embodiment, the illumination source 110 and the optical frequency converter 112 may share a common housing 116. In another embodiment, the optical frequency converter 112 may be integrated within a structure of the illumination source 110.

In some embodiments, the illumination source 110 may be configured to generate source illumination 114 having a frequency (or frequency band) in the range of 3 terahertz (THz) to 3 petahertz (PHz) and a wavelength (or range of wavelengths) in the range of in the range of 100 nanometers (nm) to 100 micrometers (µm). For example, the illumination source 110 may be configured to emit source illumination 110 in the IR or VIS spectral ranges.

The optical frequency converter 112 is configured to receive illumination 114 from the illumination source 110 and convert (e.g., multiply or shift) the frequency of the illumination 114 to generate the pump illumination 107 for the system. For example, the illumination source 110 is configured to generate illumination 114 having a first frequency (or frequency range) that corresponds to a first wavelength (or range of wavelengths), and the optical frequency converter 112 is configured to receive the illumination 114 from the illumination source 110, convert the frequency of the illumination 114, and output the frequency converted illumination as the pump illumination 107. In this regard, the pump illumination 107 is generated based on the source illumination 114 but has a second (different) frequency (or frequency range) that corresponds to a second (different) wavelength (or range of wavelengths).

The optical frequency converter 112 may comprise an optical frequency multiplier. For example, the optical frequency converter 112 may be configured to multiply (e.g., double, triple, quadruple, etc.) the fundamental output of the illumination source 110. In embodiments, the optical frequency converter 112 includes at least one nonlinear material. For example, in an embodiment, the optical frequency converter 112 includes one or more optical elements (e.g., crystals, lenses, filters, etc.) formed from lithium niobate (LN), lithium tantalate (LT), potassium titanyl phosphate (KTP), and/or lithium triborate (LBO), or the like. In such embodiments, the optical frequency converter 112 may be configured as an optical frequency doubler (i.e., configured to double the optical frequency of the source illumination 114 in order to generate the pump illumination 107). In another embodiment, the optical frequency converter 112 includes one or more optical elements (e.g., crystals, lenses, filters, etc.) formed from potassium dihydrogen phosphate (KDP) or the like. In such embodiments, the optical frequency converter 112 may be configured as an optical frequency tripler (i.e., configured to triple the optical frequency of the source illumination 114 in order to generate the pump illumination 107). These are some examples of nonlinear materials that can form at least a portion of the optical frequency converter 112. In other embodiments, the optical frequency converter 112 includes alternative materials and/or a combination of materials to achieve a selected frequency conversion (e.g., frequency shifting, multiplication, and/or nonlinear transformation).

In embodiments, the illumination source 110 includes one or more lasers. In a general sense, the illumination source 110 may include any laser system known in the art. For instance, the illumination source 110 may include any laser system known in the art capable of emitting illumination in the infrared, visible or ultraviolet portions of the electromagnetic spectrum. In embodiments, the illumination source 110 may include a laser system configured to emit continuous wave (CW) illumination, configured to emit pulsed illumination, or configured to selectively emit CW or pulsed illumination (e.g., based upon a selected mode of the illumination source 110). For example, the illumination source 110 may include, but is not limited to, a Yb or Yt fiber laser, a Yb or Yt disk laser, Nd:YAG solid state laser, Nd:YLF laser, or the like. In other embodiments, the illumination source 110 may include one or more non-laser sources. For example, the illumination source 110 may include any non-laser illumination source known in the art, such as a non-laser system capable of emitting illumination discretely or continuously in the infrared, visible or ultraviolet portions of the electromagnetic spectrum.

In some embodiments, the optical frequency converter 112 includes or is coupled to an optical resonator (e.g., an optical cavity) that is configured to direct the source illumination 114 through multiple passes of the nonlinear media of the optical frequency converter 112. This can be especially useful when the illumination source 110 is a CW illumination source (e.g., CW laser). Frequency converting the fundamental (e.g., near-IR) output of a CW laser can be difficult. It is based on non-linear processes and requires very high laser intensities that are hard to achieve in CW. The use of an optical resonator to provide multiple passes of the fundamental harmonic through the nonlinear media can help mitigate the fact that conversion efficiencies are not very high in CW.

Frequency conversion is easier when the illumination source 110 is a pulsed illumination source (e.g., a pulsed laser). For example, when the source illumination 114 comprises a train of short (e.g., ~picosecond) pulses. The instantaneous intensity for such a train is orders of magnitude higher than for equal power CW and, consequently, frequency conversion is easier. Another benefit of pumping LSP by a train of pulses is that higher temperatures can be achieved in the pulsed regime.

It is contemplated that a plasma 104 (e.g., LSP) can be sustained by a train of such short pulses provided that the repetition rate of these pulses is higher than the inverse time of plasma decay. Typically, it takes about a microsecond to extinguish LSP. Thus, in some embodiments, the illumination source 110 is configured to emit pulsed illumination with a 1 megahertz (MHz) or higher repetition rate to ensure that the next pump pulse arrives to the plasma 104 before it has a chance to go off. In other embodiments, the repetition rate of the pulsed illumination source is at least 200 kilohertz. In some embodiments, the repetition rate of the pulsed illumination source is in the range of 1 megahertz to 1000 megahertz. In some embodiments, a pulse duration of the pulsed illumination source is in the range of 1 picosecond to 1000 picoseconds. In an embodiment, the illumination source 110 is a mode-locked Nd:YAG laser with about 100 MHz repetition rate and about 100 picosecond pulse. These examples are provided for illustrative purposes and are not intended as limitations of the present disclosure unless otherwise provided herein.

FIG. 1A shows an embodiment of a system 100 for generating and/or maintaining a plasma 104 (e.g., LSP) with pump illumination 107 generated by the illumination system 111. However, it is noted that the embodiment shown in FIG. 1A is one implementation, and the system 100 can also be implemented in accordance with any LSP light source configuration known in the art. Furthermore, the frequency converted illumination system 111 described herein can be implemented in any other LSP system architecture without departing from the scope of this disclosure.

In embodiments, the system 100 includes a plasma site 102 (e.g. for generating, or maintaining, a plasma 104). The plasma site 102 may include, but is not limited to, a plasma cell, plasma bulb, chamber, drum, or the like. The plasma site 102 can be configured to contain or support plasma forming material 103 (e.g., a gas or gas mixture and/or liquid or solid plasma forming material). Focusing pump illumination 107 from the illumination system 111 onto/into the plasma forming material 103 may cause energy to be absorbed through one or more selected absorption lines of the plasma forming material 103 or plasma 104 at the plasma site 102, thereby "pumping" the plasma forming material 103 in order to generate or sustain plasma 104. In some embodiments, although not shown, the plasma site 102 may include a set of electrodes for initiating the plasma 104 within the internal volume of the plasma site 102, whereby the pump illumination 107 from the illumination system 111 maintains the plasma 104 after ignition by the electrodes. The plasma 104 may emit broadband illumination, for example, upon relaxation of gas species to a lower energy level.

In some embodiments, excimers may form within the volume of gas outside of the generated plasma 104 at temperatures suitable for generating and/or maintaining a bound excimer state (e.g. a bound molecular state associated with one or more components of the plasma forming material 103) representing an excited energy state of the molecule. Excimers may emit illumination in the ultraviolet spectrum upon relaxation (e.g. de-excitation, or the like) to a lower energy state of the excimer. De-excitation of an excimer may result in a dissociation of the excimer molecule. For example, $Ar_2^*$ excimers may emit at 126 nm, $Kr_2^*$ excimers may emit at 146 nm, and $Xe_2^*$ excimers may emit at 172 nm or 175 nm. It is noted that the spectral content of illumination emanating from the plasma site 102 may include spectral components associated with emission from the plasma 104 and/or one or more excimers within the plasma site 102.

The system 100 may include a collector element 105 (e.g., an ellipsoidal or a spherical collector element) configured to focus illumination emanating from the illumination system 111 into a volume of a plasma forming material 103 contained within the plasma site 102. In embodiments, the collector element 105 is arranged to collect broadband illumination 115 emitted by plasma 104 and direct the broadband illumination 115 to one or more additional optical elements (e.g., filter 123, homogenizer 125, and the like). It is noted that the above configuration is not a limitation on the scope of the present disclosure. For example, the system 100 may include one or more reflector and/or focus optics for focusing and/or directing illumination from illumination system 111 into the volume of the plasma forming material 103 and a separate set of collection optics for collecting broadband illumination 115 emitted by the plasma 104. For example, an optical configuration including separate reflector optics and collection optics is described in U.S. Patent Publication No. 2016/0381776, published on Dec. 29, 2016, which is incorporated herein by reference in the entirety.

In some embodiments, the system 100 includes one or more propagation elements configured to direct and/or process illumination emitted from the plasma site 102. For example the one or more propagation elements may include, but are not limited to, transmissive elements (e.g. transparent portions of the plasma site 102, one or more filters 123, and the like), reflective elements (e.g. the collector element 105, mirrors to direct the broadband illumination 115, and the like), or focusing elements (e.g. lenses, focusing mirrors, and the like).

It is noted herein that broadband emission 115 of plasma illumination is generally influenced by a multitude of factors including, but not limited to, the focused intensity of pump illumination 107 from the illumination system 111, the temperature of the plasma forming material 103, the pressure of the plasma forming material 103, and/or the composition of the plasma forming material 103. Further, spectral content of broadband illumination 115 emitted by the plasma 104 and/or the plasma forming material 103 (e.g. one or more excimers within the plasma site 102) may include, but is not limited to, infrared (IR), visible (VIS), ultraviolet (UV), vacuum ultraviolet (VUV), deep ultraviolet (DUV), or extreme ultraviolet (EUV) wavelengths. In an embodiment, the plasma 104 emits visible and IR illumination with wavelengths in at least the range of 600 to 1000 nm. In another embodiment, the plasma 104 emits visible and UV illumination with wavelengths in at least the range of 200 to 600 nm. In another embodiment, the plasma 104 emits at least short-wavelength illumination having a wavelength below 200 nm. In a further embodiment, one or more excimers in the plasma site 102 emit UV and/or VUV illumination. It is noted herein that the present disclosure is not limited to the wavelength ranges described above and the plasma 104 and/or excimers in the plasma site 102 may emit illumination having wavelengths in one or any combination of the ranges provided above.

It is contemplated herein that the system 100 may be utilized to initiate and/or sustain a plasma 104 using a variety of plasma forming materials 103. In an embodiment, the plasma forming material 103 used to initiate and/or maintain the plasma 104 may include a noble gas, an inert gas (e.g., noble gas or non-noble gas) and/or a non-inert gas (e.g., mercury). In another embodiment, the plasma forming material 103 includes a mixture of a gas (e.g., noble gas, non-noble gases and the like) and one or more gaseous trace materials (e.g., metal halides, transition metals and the like). For example, gases suitable for implementation in the present disclosure may include, but are not limited to Xe, Ar, Ne, Kr, He, $N_2$, $H_2O$, $O_2$, $H_2$, $D_2$, $F_2$, $CH_4$, metal halides, halogens, Hg, Cd, Zn, Sn, Ga, Fe, Li, Na, K, Tl, In, Dy, Ho, Tm, ArXe, ArHg, ArKr, ArRn, KrHg, XeHg, and the like. In a general sense, the present disclosure should be interpreted to extend to any LSP system and any type of gas mixture suitable for sustaining a plasma 104 at or within a plasma site 102.

Referring again to FIG. 1A, the plasma site 102 may include any type of plasma site 102 known in the art suitable for initiating and/or maintaining a plasma 104. For example, in an embodiment, the plasma site 102 includes a plasma cell. The use of a plasma cell is described in at least U.S. Pat. No. 9,775,226, granted on Sep. 26, 2017; and U.S. Pat. No. 9,185,788, granted on Nov. 10, 2015, which are each incorporated herein by reference in the entirety. In another embodiment, the plasma site 102 includes a plasma bulb. The use of a plasma bulb is described in at least in U.S. Pat. No. 7,786,455, granted on Aug. 31, 2010; and U.S. Pat. No. 9,318,311, granted on Apr. 19, 2016, which are each incorporated herein by reference in the entirety.

It is noted herein that the various optical elements (e.g., illumination optics 119, 121; collection optics 105; and the like) may also be enclosed within the plasma site 102. In an embodiment, the plasma site 102 is a chamber suitable for containing a plasma forming material 103 and one or more optical components. For example, the use of a self-contained gas chamber is described in U.S. Pat. No. 9,099,292, granted on Aug. 4, 2015, which is incorporated herein by reference in the entirety.

In some embodiments, the plasma site 102 (e.g., plasma cell plasma bulb, chamber and the like) includes one or more transparent portions. The transparent portions can be formed from any material known in the art that is at least partially transparent to illumination generated by plasma 104. In an embodiment, the transparent portions may be formed from any material known in the art that is at least partially transparent to IR illumination, visible illumination and/or UV illumination 107 from the illumination system 111. In another embodiment, the transparent portions may be formed from any material known in the art that is at least partially transparent to the broadband illumination 115 emitted from the plasma 104. In an embodiment, a plasma site 102 contains a plasma forming material 103 including one or more gas components to suppress wavelengths of illumination corresponding to an absorption spectrum of any of the transparent portions of the plasma site 102. With regard to this embodiment, benefits of the inhibition of undesired wavelengths by the plasma forming material 103 may include, but are not limited to, reduced damage, reduced solarization, or reduced heating of the transparent portion of the plasma site 102.

In some embodiments, the transparent portions of the plasma site 102 may be formed from a low-OH content fused silica glass material. In other embodiments, the transparent portions of the plasma site 102 may be formed from high-OH content fused silica glass material. For example, the transparent portion of the plasma site 102 may include, but is not limited to, SUPRASIL 1, SUPRASIL 2, SUPRASIL 300, SUPRASIL 310, HERALUX PLUS, HERALUX-VUV, and the like. In other embodiments, the transparent portion of the plasma site 102 may include, but is not limited to, $CaF_2$, $MgF_2$, LiF, crystalline quartz and sapphire. It is noted herein that materials such as, but not limited to, $CaF_2$, $MgF_2$, crystalline quartz and sapphire provide transparency to short-wavelength illumination (e.g., $\lambda$<190 nm). Various glasses suitable for implementation in the transparent portion of the plasma site 102 (e.g., chamber window, glass bulb, glass tube or transmission element) of the present disclosure are discussed in detail in A. Schreiber et al., Radiation Resistance of Quartz Glass for VUV Discharge Lamps, J. Phys. D: Appl. Phys. 38 (2005), 3242-3250, which is incorporated herein by reference in the entirety. It is noted herein that fused silica does provide some transparency to illumination having wavelength shorter than 190 nm, showing useful transparency to wavelengths as short as 170 nm.

The one or more transparent portions of the plasma site 102 may take on any shape known in the art. In an embodiment, the transparent may have a cylindrical shape. In another embodiment, the transparent portion may have a spherical shape. In another embodiment, the transparent portion may have a composite shape. For example, the shape of the transparent portion may consist of a combination of two or more shapes.

The collector element 105 may take on any physical configuration known in the art suitable for focusing illumination emanating from the illumination system 111 into or onto the plasma forming material 103. In an embodiment (e.g., as shown in FIG. 1A), the collector element 105 may include a concave region with a reflective internal surface suitable for receiving illumination 107 from the illumination system 111 and focusing the illumination 107 into the volume of plasma forming material 103 contained within the plasma site 102. For example, the collector element 105 may include an ellipsoid-shaped collector element 105 having a reflective internal surface, as shown in FIG. 1A. As another example, the collector element 105 may include a spherical-shaped collector element 105 having a reflective internal surface.

In some embodiments, the collector element 105 collects broadband illumination 115 emitted by plasma 104 and directs the broadband illumination 115 to one or more downstream optical elements. For example, the one or more downstream optical elements may include, but are not limited to, a homogenizer 125, one or more focusing elements, a filter 123, a stirring mirror and the like. In some embodiments, the collector element 105 may collect broadband illumination 115 including EUV, DUV, VUV, UV, visible and/or infrared illumination emitted by plasma 104 and direct the broadband illumination to one or more downstream optical elements. In this regard, the plasma site 102 may deliver EUV, DUV, VUV, UV, visible, and/or infrared illumination to downstream optical elements of any optical characterization system known in the art, such as, but not limited to, an inspection tool or a metrology tool. For example, the LSP system 100 may serve as an illumination sub-system, or illuminator, for a broadband inspection tool (e.g., wafer or reticle inspection tool), a metrology tool or a photolithography tool. It is noted herein the plasma site 102 of system 100 may emit useful illumination in a variety of spectral ranges including, but not limited to, EUV, DUV illumination, VUV illumination, UV illumination, visible illumination, and infrared illumination.

In some embodiments, the system 100 may include various additional optical elements. For example, additional optics may include collection optics configured to collect broadband illumination emanating from the plasma 104. For instance, the system 100 may include a cold mirror 121 (e.g. operating as a beam splitter, a sampler, or the like) arranged to direct illumination from the collector element 105 to downstream optics, such as, but not limited to, a homogenizer 125.

In some embodiments, the system 100 may include one or more additional lenses placed along either the illumination pathway or the collection pathway of system 100. The one or more lenses may be utilized to focus illumination from the illumination system 111 into the volume of plasma forming material 103. Alternatively, the one or more additional lenses may be utilized to focus broadband illumination emitted by the plasma 104 onto a selected target (not shown).

In some embodiments, the system 100 may include a turning mirror 119. The turning mirror 119 may be arranged to receive illumination 107 from the illumination system 111 and direct the illumination 107 to the plasma forming material 103 via collection element 105. The collection element 105 may be arranged to receive illumination 107 from mirror 119 and focus the illumination 107 to the focal point of the collection element 105 (e.g., ellipsoid-shaped collection element), where the plasma forming material 103 or plasma 104 is located.

It is noted herein that the set of optics of system 100 as described above and illustrated in FIGS. 1A and 1B are provided for illustration and should not be interpreted as limiting. It is contemplated that a number of equivalent optical configurations may be utilized within the scope of the present disclosure.

Figure 6:
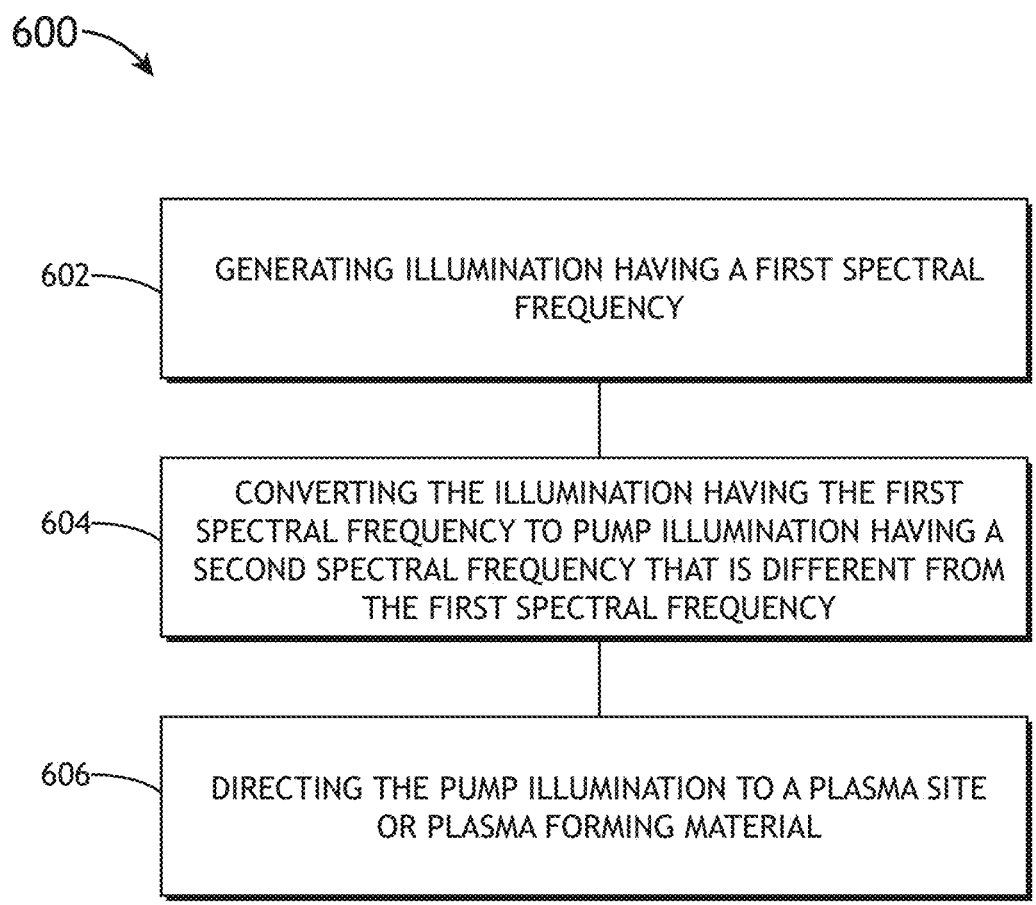
FIG. 6 is a flow diagram illustrating method for generating broadband illumination by pumping LSP with a frequency converted illumination source, in accordance with one or more implementations.

FIG. 6 is a flow diagram illustrating one or more implementations of a method 600 for generating broadband illumination by pumping LSP with a frequency converted illumination source. It is noted that the embodiments and enabling technologies described previously herein in the context of system 100 should be interpreted to extend to method 600. In this regard, the steps of method 600 may be carried out by system 100, and the method 600 may further include one or more steps required or implied by the architecture of system 100. However, the method 600 is not limited to the architecture of system 100, and it is recognized that one or more steps of method 600, or portions thereof, may be carried out with alternative system components and/or architecture.

At step 602, illumination 114 having a first spectral frequency is generated. For example, the illumination source 110 can be configured to generate illumination 114 having a first spectral frequency (or frequency band) and a first wavelength (or range of wavelengths). In some embodiments, the illumination source 110 may be configured to generate source illumination 114 having a frequency (or frequency band) in the range of 3 terahertz (THz) to 3 petahertz (PHz) and a wavelength (or range of wavelengths) in the range of in the range of 100 nanometers (nm) to 100 micrometers (μm). For example, the illumination source 110 may be configured to emit source illumination 110 in the IR or VIS spectral ranges.

At step 604, the illumination 114 having the first spectral frequency is frequency converted (e.g., frequency up-converted) to generate pump illumination 107 having a second spectral frequency that is different from the first spectral frequency. For example, the optical frequency converter 112 can be configured to receive illumination 114 from the illumination source 110 and convert (e.g., multiply or shift) the frequency of the illumination 114 to generate the pump illumination 107 for the system. In embodiments, the illumination source 110 is configured to generate illumination 114 having a first frequency (or frequency range) that corresponds to a first wavelength (or range of wavelengths), and the optical frequency converter 112 is configured to receive the illumination 114 from the illumination source 110, convert the frequency of the illumination 114, and output the frequency converted illumination as the pump illumination 107.

At step 606, the pump illumination 107 is directed to a plasma site 102 or a plasma forming material 103. For example, illumination optics 119, 121 and/or collection optics 105 can be configured to direct the pump illumination 107 from the illumination system 111 to the plasma site 102. In some embodiments, the pump illumination 107 causes the plasma forming material 103 to form a plasma 104 that emits broadband illumination. In other embodiments, the pump illumination 107 pumps (i.e., sustains) the plasma 104 after the plasma 104 is already present in the system 100.

Figure 7:
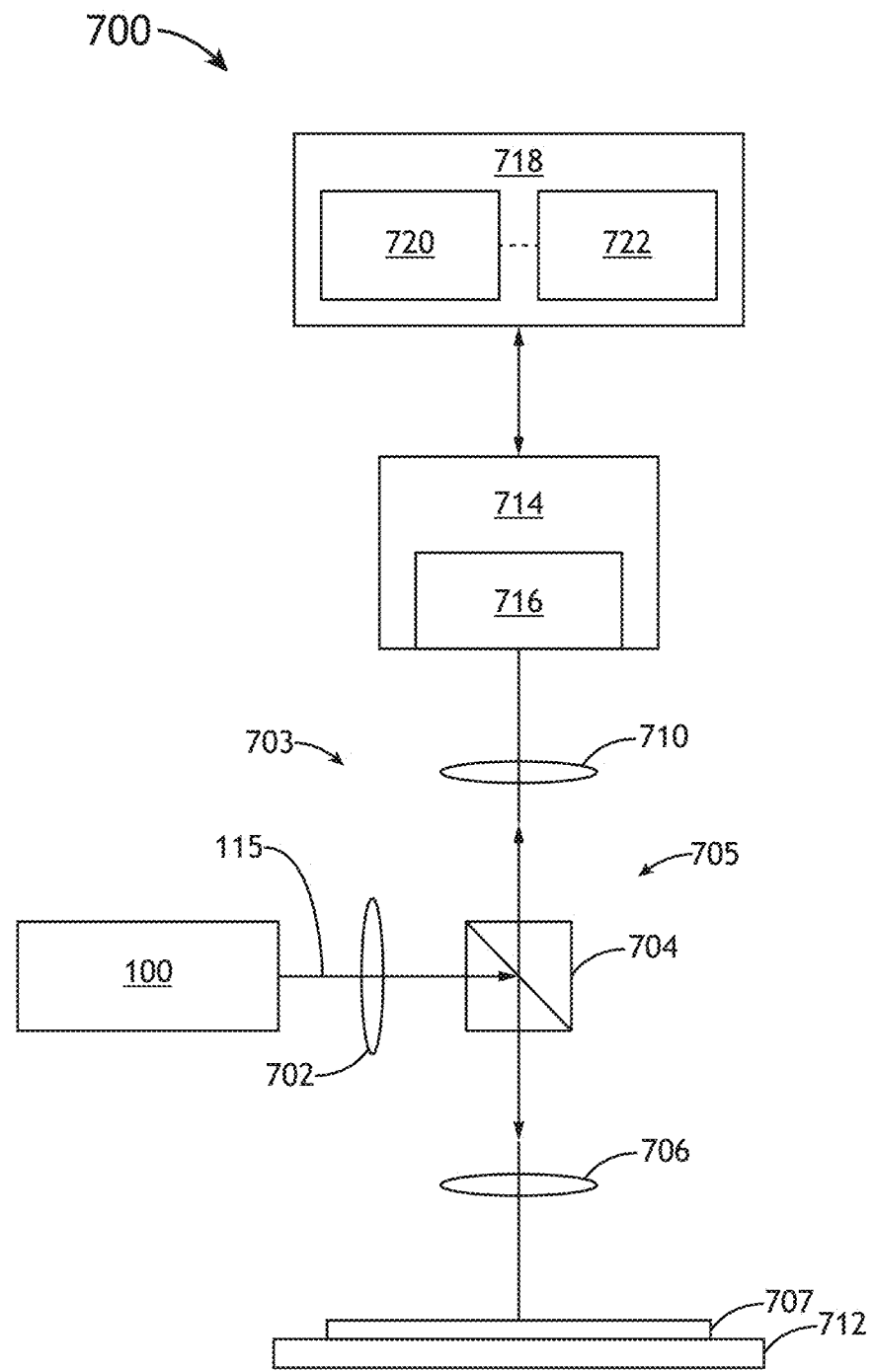
FIG. 7 illustrates a simplified schematic view of an optical characterization system implementing a LSP illumination source, such as the system illustrated in FIG. 1, in accordance with one or more embodiments of the present disclosure.
Figure 8:
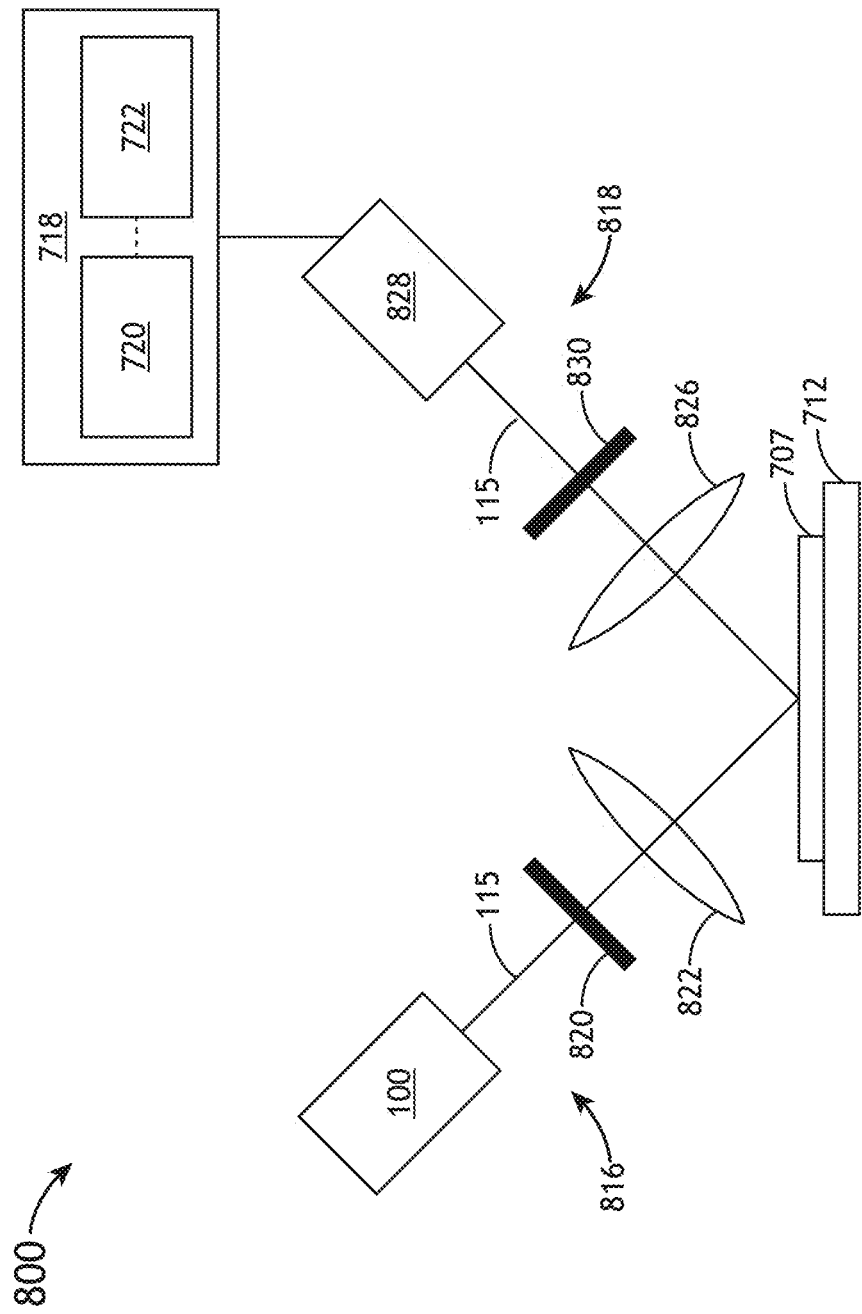
FIG. 8 illustrates a simplified schematic view of an optical characterization system implementing a LSP illumination source, such as the system illustrated in FIG. 1, in accordance with one or more embodiments of the present disclosure.

FIG. 7 illustrates a simplified schematic view of an optical characterization system 700 implementing the LSP illumination system 100, in accordance with one or more embodiments of the present disclosure. In one embodiment, system 700 includes the LSP illumination system 100, an illumination arm 703, a collection arm 705, a detector assembly 714, and a controller 718 including one or more processors 720 and memory 722.

It is noted herein that system 700 may comprise any imaging, inspection, metrology, lithography, or other characterization system known in the art. In this regard, system 700 may be configured to perform inspection, optical metrology, lithography, and/or any form of imaging on a specimen 707. Specimen 707 may include any sample known in the art including, but not limited to, a wafer, a reticle/photomask, and the like. It is noted that system 700 may incorporate one or more of the various embodiments of the LSP illumination system 100 described throughout the present disclosure.

In one embodiment, specimen 707 is disposed on a stage assembly 712 to facilitate movement of specimen 707. Stage assembly 712 may include any stage assembly 712 known in the art including, but not limited to, an X-Y stage, an R-θ stage, and the like. In another embodiment, stage assembly 712 is capable of adjusting the height of specimen 707 during inspection or imaging to maintain focus on the specimen 707.

In another embodiment, the illumination arm 703 is configured to direct illumination 115 from the LSP illumination system 100 to the specimen 707. The illumination arm 703 may include any number and type of optical components known in the art. In one embodiment, the illumination arm 703 includes one or more optical elements 702, a beam splitter 704, and an objective lens 706. In this regard, illumination arm 703 may be configured to focus illumination 115 from the LSP illumination system 100 onto the surface of the specimen 707. The one or more optical elements 702 may include any optical element or combination of optical elements known in the art including, but not limited to, one or more mirrors, one or more lenses, one or more polarizers, one or more gratings, one or more filters, one or more beam splitters, and the like.

In another embodiment, the collection arm 705 is configured to collect light reflected, scattered, diffracted, and/or emitted from specimen 707. In another embodiment, collection arm 705 may direct and/or focus the light from the specimen 707 to a sensor 716 of a detector assembly 714. It is noted that sensor 716 and detector assembly 714 may include any sensor and detector assembly known in the art. The sensor 716 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 716 may include, but is not limited to, a line sensor or an electron-bombarded line sensor.

In another embodiment, detector assembly 714 is communicatively coupled to a controller 718 including one or more processors 720 and memory 722. For example, the one or more processors 720 may be communicatively coupled to memory 722, wherein the one or more processors 720 are configured to execute a set of program instructions stored on memory 722. In one embodiment, the one or more processors 720 are configured to analyze the output of detector assembly 714. In one embodiment, the set of program instructions are configured to cause the one or more processors 720 to analyze one or more characteristics of specimen 707. In another embodiment, the set of program instructions are configured to cause the one or more processors 720 to modify one or more characteristics of system 700 in order to maintain focus on the specimen 707 and/or the sensor 716. For example, the one or more processors 720 may be configured to adjust the objective lens 706 or one or more optical elements 702 in order to focus illumination 115 from LSP illumination system 100 onto the surface of the specimen 707. By way of another example, the one or more processors 720 may be configured to adjust the objective lens 706 and/or one or more optical elements 710 in order to collect illumination from the surface of the specimen 707 and focus the collected illumination on the sensor 716.

It is noted that the system 700 may be configured in any optical configuration known in the art including, but not limited to, a dark-field configuration, a bright-field orientation, and the like.

It is noted herein that the one or more components of system 100 may be communicatively coupled to the various other components of system 100 in any manner known in the art. For example, the LSP illumination system 100, detector assembly 714, controller 718, and one or more processors 720 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

FIG. 3 illustrates a simplified schematic diagram of an optical characterization system 800 arranged in a reflectometry and/or ellipsometry configuration, in accordance with one or more embodiments of the present disclosure. It is noted that the various embodiments and components described with respect to FIG. 7 may be interpreted to extend to the system of FIG. 3. The system 800 may include any type of metrology system known in the art.

In one embodiment, system 800 includes the LSP illumination system 100, an illumination arm 816, a collection arm 818, a detector assembly 828, and the controller 718 including the one or more processors 720 and memory 722.

In this embodiment, the broadband illumination 115 from the LSP illumination source is directed to the specimen 707 via the illumination arm 816. In another embodiment, the system 800 collects illumination emanating from the sample via the collection arm 818. The illumination arm pathway 816 may include one or more beam conditioning components 820 suitable for modifying and/or conditioning the broadband beam 115. For example, the one or more beam conditioning components 820 may include, but are not limited to, one or more polarizers, one or more filters, one or more beam splitters, one or more diffusers, one or more homogenizers, one or more apodizers, one or more beam shapers, or one or more lenses.

In another embodiment, the illumination arm 816 may utilize a first focusing element 822 to focus and/or direct the beam 115 onto the specimen 707 disposed on the sample stage 712. In another embodiment, the collection arm 818 may include a second focusing element 826 to collect illumination from the specimen 707.

In another embodiment, the detector assembly 828 is configured to capture illumination emanating from the specimen 707 through the collection arm 818. For example, the detector assembly 828 may receive illumination reflected or scattered (e.g., via specular reflection, diffuse reflection, and the like) from the specimen 707. By way of another example, the detector assembly 828 may receive illumination generated by the specimen 707 (e.g., luminescence associated with absorption of the beam 115, and the like). It is noted that detector assembly 828 may include any sensor and detector assembly known in the art. The sensor may include, but is not limited to, CCD detector, a CMOS detector, a TDI detector, a PMT, an APD, and the like.

The collection arm 818 may further include any number of collection beam conditioning elements 830 to direct and/or modify illumination collected by the second focusing element 826 including, but not limited to, one or more lenses, one or more filters, one or more polarizers, or one or more phase plates.

The system 800 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. patent application Ser. No. 13/544,954, entitled "Wafer Inspection," filed on Jul. 9, 2012; U.S. Published Patent Application 2009/0180176, entitled "Split Field Inspection System Using Small Catadioptric Objectives," published on Jul. 16, 2009; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 720 of the present disclosure may include any one or more processing elements known in the art. In this sense, the one or more processors 720 may include any microprocessor-type device configured to execute software algorithms and/or instructions. It should be recognized that the steps described throughout the present disclosure may be carried out by a single computer system or, alternatively, multiple computer systems. In general, the term "processor" may be broadly defined to encompass any device having one or more processing and/or logic elements, which execute program instructions from a non-transitory memory medium 722. Moreover, different subsystems of the various systems disclosed may include processor and/or logic elements suitable for carrying out at least a portion of the steps described throughout the present disclosure.

The memory medium 722 may include any storage medium known in the art suitable for storing program instructions executable by the associated one or more processors 720. For example, the memory medium 722 may include a non-transitory memory medium. For instance, the memory medium 722 may include, but is not limited to, a read-only memory, a random access memory, a magnetic or optical memory device (e.g., disk), a magnetic tape, a solid state drive, and the like. In another embodiment, the memory 722 is configured to store one or more results and/or outputs of the various steps described herein. It is further noted that memory 722 may be housed in a common controller housing with the one or more processors 720. In an alternative embodiment, the memory 722 may be located remotely with respect to the physical location of the one or more processors 720. For instance, the one or more processors 720 may access a remote memory (e.g., server), accessible through a network (e.g., internet, intranet, and the like). In this regard, the one or more processors 720 of the controller 718 may execute any of the various process steps described throughout the present disclosure.

In some embodiments, the LSP illumination system 100 and systems 700, 800, as described herein, may be configured as a "stand alone tool," interpreted herein as a tool that is not physically coupled to a process tool. In other embodiments, such an inspection or metrology system may be coupled to a process tool (not shown) by a transmission medium, which may include wired and/or wireless portions. The process tool may include any process tool known in the art such as a lithography tool, an etch tool, a deposition tool, a polishing tool, a plating tool, a cleaning tool, or an ion implantation tool. The results of inspection or measurement performed by the systems described herein may be used to alter a parameter of a process or a process tool using a feedback control technique, a feedforward control technique, and/or an in-situ control technique. The parameter of the process or the process tool may be altered manually or automatically.

The embodiments of the LSP illumination system 100 and systems 700, 800 may be further configured as described herein. In addition, the LSP illumination system 100 and systems 700, 800 may be configured to perform any other step(s) of any of the method embodiment(s) described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for generating pump illumination for a laser sustained plasma, comprising:
an illumination source configured to output illumination having a first spectral frequency, wherein a wavelength of the illumination having the first spectral frequency is in the range of 100 nanometers (nm) to 100 micrometers (µm); and
an optical frequency converter configured to receive the illumination having the first spectral frequency from the illumination source and configured to output pump illumination having a second spectral frequency that is different from the first spectral frequency.

2. The system of claim 1, further comprising one or more optical elements configured to direct the pump illumination to the laser sustained plasma.

3. The system of claim 1, wherein the illumination source comprises a continuous wave illumination source.

4. The system of claim 3, wherein the optical frequency converter comprises an optical resonator.

5. The system of claim 4, wherein the optical resonator comprises an optical cavity.

6. The system of claim 1, wherein the illumination source comprises a pulsed illumination source.

7. The system of claim 6, wherein a repetition rate of the pulsed illumination source is higher than an inverse time of plasma decay for the laser sustained plasma.

8. The system of claim 6, wherein a repetition rate of the pulsed illumination source is at least 200 kilohertz.

9. The system of claim 6, wherein a repetition rate of the pulsed illumination source is in the range of 1 megahertz to 1000 megahertz.

10. The system of claim 6, wherein a pulse duration of the pulsed illumination source is in the range of 1 picosecond to 1000 picoseconds.

11. The system of claim 1, wherein the optical frequency converter comprises an optical frequency multiplier.

12. The system of claim 11, wherein the optical frequency multiplier is configured to double, triple, or quadruple the spectral frequency of the illumination received from the illumination source.

13. The system of claim 1, wherein the illumination source comprises a Nd:YAG laser.

14. The system of claim 1, wherein the illumination source comprises at least one of a Yt fiber laser or a Yt disk laser.

15. The system of claim 1, further comprising a housing configured to contain the illumination source and the optical frequency converter.

16. The system of claim 1, wherein the first spectral frequency is in the range of 3 terahertz (THz) to 3 petahertz (PHz).

17. A system for generating broadband illumination, comprising:
a plasma forming material;
an illumination source configured to output illumination having a first spectral frequency, wherein a wavelength of the illumination having the first spectral frequency is in the range of 100 nanometers (nm) to 100 micrometers (μm);

an optical frequency converter configured to receive the illumination having the first spectral frequency from the illumination source and configured to output pump illumination having a second spectral frequency that is different from the first spectral frequency;

one or more optical elements configured to direct the pump illumination to the plasma forming material, whereby the pump illumination causes the plasma forming material to form a laser sustained plasma that emits broadband illumination.

18. The system of claim 17, further comprising one or more collection optics configured to receive the broadband illumination and direct the broadband illumination to an output.

19. The system of claim 17, wherein the illumination source comprises a continuous wave illumination source.

20. The system of claim 19, wherein the optical frequency converter comprises an optical resonator.

21. The system of claim 20, wherein the optical resonator comprises an optical cavity.

22. The system of claim 17, wherein the illumination source comprises a pulsed illumination source.

23. The system of claim 22, wherein a repetition rate of the pulsed illumination source is higher than an inverse time of plasma decay for the laser sustained plasma.

24. The system of claim 22, wherein a repetition rate of the pulsed illumination source is at least 200 kilohertz.

25. The system of claim 22, wherein a repetition rate of the pulsed illumination source is in the range of 1 megahertz to 1000 megahertz.

26. The system of claim 22, wherein a pulse duration of the pulsed illumination source is in the range of 1 picosecond to 1000 picoseconds.

27. The system of claim 17, wherein the optical frequency converter comprises an optical frequency multiplier.

28. The system of claim 27, wherein the optical frequency multiplier is configured to double, triple, or quadruple the spectral frequency of the illumination received from the illumination source.

29. The system of claim 17, wherein the illumination source comprises a Nd:YAG laser.

30. The system of claim 17, wherein the illumination source comprises at least one of a Yt fiber laser or a Yt disk laser.

31. The system of claim 17, further comprising a housing configured to contain the illumination source and the optical frequency converter.

32. The system of claim 17, wherein the first spectral frequency is in the range of 3 terahertz (THz) to 3 petahertz (PHz).

33. A method of generating broadband illumination, comprising:
generating illumination having a first spectral frequency, wherein a wavelength of the illumination having the first spectral frequency is in the range of 100 nanometers (nm) to 100 micrometers (μm);
converting the illumination having the first spectral frequency to pump illumination having a second spectral frequency that is different from the first spectral frequency;
directing the pump illumination to a plasma forming material, whereby the pump illumination causes the plasma forming material to form a laser sustained plasma that emits broadband illumination.

34. A system for generating pump illumination for a laser sustained plasma, comprising:
a pulsed illumination source configured to output illumination having a first spectral frequency, wherein a repetition rate of the pulsed illumination source is higher than an inverse time of plasma decay for the laser sustained plasma; and
an optical frequency converter configured to receive the illumination having the first spectral frequency from the pulsed illumination source and configured to output pump illumination having a second spectral frequency that is different from the first spectral frequency.

35. A system for generating broadband illumination, comprising:
a plasma forming material;
a pulsed illumination source configured to output illumination having a first spectral frequency;
an optical frequency converter configured to receive the illumination having the first spectral frequency from the pulsed illumination source and configured to output pump illumination having a second spectral frequency that is different from the first spectral frequency;
one or more optical elements configured to direct the pump illumination to the plasma forming material, whereby the pump illumination causes the plasma forming material to form a laser sustained plasma that emits broadband illumination, wherein a repetition rate of the pulsed illumination source is higher than an inverse time of plasma decay for the laser sustained plasma.

36. A method of generating broadband illumination, comprising:
generating pulsed illumination having a first spectral frequency;
converting the pulsed illumination having the first spectral frequency to pump illumination having a second spectral frequency that is different from the first spectral frequency;
directing the pump illumination to a plasma forming material, whereby the pump illumination causes the plasma forming material to form a laser sustained plasma that emits broadband illumination, wherein a repetition rate of the pulsed illumination is higher than an inverse time of plasma decay for the laser sustained plasma.

* * * * *